(12) United States Patent
Schwendemann

(10) Patent No.: US 6,813,938 B2
(45) Date of Patent: Nov. 9, 2004

(54) METHOD AND APPARATUS FOR TESTING WHEELS

(75) Inventor: Heinz Schwendemann, Bonn (DE)

(73) Assignee: Hayes Lemmerz Holding GmbH, Konigswinter (DE)

( * ) Notice: Subject to any disclaimer, the term of this patent is extended or adjusted under 35 U.S.C. 154(b) by 422 days.

(21) Appl. No.: 10/009,403

(22) PCT Filed: Mar. 3, 2001

(86) PCT No.: PCT/EP01/02437
§ 371 (c)(1),
(2), (4) Date: Oct. 25, 2001

(87) PCT Pub. No.: WO01/71307
PCT Pub. Date: Sep. 27, 2001

(65) Prior Publication Data
US 2004/0069078 A1 Apr. 15, 2004

(30) Foreign Application Priority Data
Mar. 21, 2000 (DE) .................... 100 13 965 U

(51) Int. Cl.[7] ............................. G01M 17/02
(52) U.S. Cl. ........................................ 73/146
(58) Field of Search ........................... 73/146

(56) References Cited
U.S. PATENT DOCUMENTS
6,116,084 A * 9/2000 Fischer et al. ............... 73/146

FOREIGN PATENT DOCUMENTS

| EP | 0 507 058 | 2/1992 |
|---|---|---|
| EP | 0 927 879 | 12/1998 |
| EP | 0 928 961 | 1/1999 |

OTHER PUBLICATIONS

Peter Siegfried Angerer, *The Bi–Axial Wheel Test Rig, Automobiltechnische Zeitschrift*, 88 (1986) 10.

* cited by examiner

Primary Examiner—Robert Raevis
(74) Attorney, Agent, or Firm—Fay, Sharpe, Fagan, Minnich & McKee

(57) ABSTRACT

A control method and apparatus for a biaxial wheel test stand for simulating driving loads. The test stand including a load unit having a servo-hydraulic vertical load cylinder for adjusting a vertical force, a servo-hydraulic horizontal load cylinder for adjusting a horizontal force, and a pivot head which can be adjusted by means of a camber cylinder for adjusting the camber angle of a wheel to be tested. The test stand further including a drive unit with a driven drum having starting rings, to which the wheel to be tested is pressed with the load units, wherein the vertical load cylinder and the horizontal load cylinder control the forces and the camber cylinder controls the camber angle. The method including the steps of adjusting the horizontal force, the vertical force and the camber angle in dependence on the wheel radial force land the wheel side force which were determined during a road test, and using the position of the point of application of the resulting force of the wheel radial force and the wheel side force as the control magnitude for the camber angle.

11 Claims, 1 Drawing Sheet

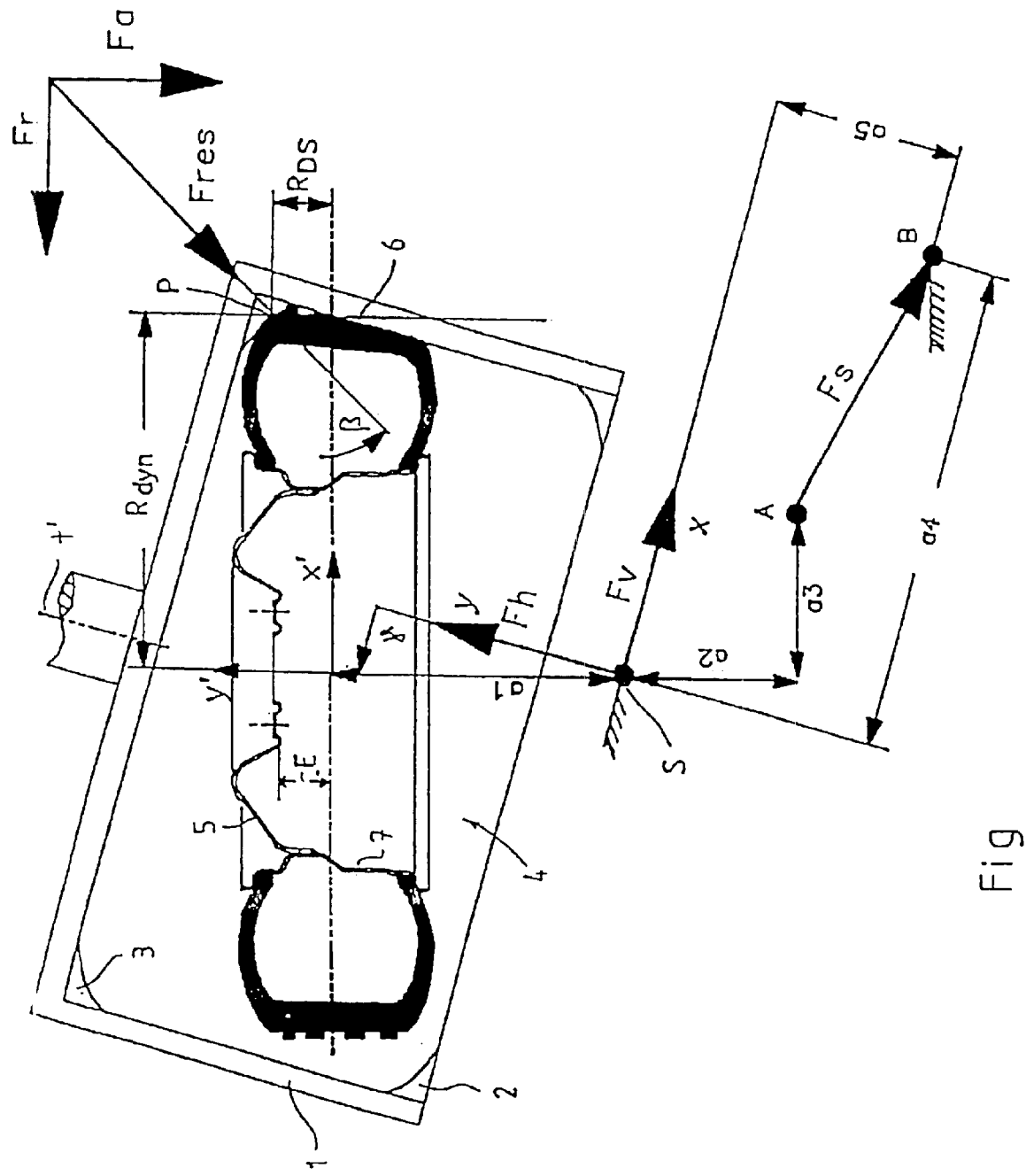
Fig

METHOD AND APPARATUS FOR TESTING WHEELS

The invention relates to a control method for a biaxial wheel test stand for the simulation of driving loads which consists of a load unit for adjusting the vertical and horizontal forces and a pivot head for adjusting the camber angle of the wheel to be tested. The test stand further includes a drive unit with a driven drum having starting rings to which the wheel to be tested is pressed by the load unit. The simulation is controlled by adjusting the vertical and horizontal forces along with the change in camber angle.

BACKGROUND OF THE INVENTION

A vehicle wheel is subject to extreme and continually changing loads during a real driving environment. The vehicle wheel, as a safety unit on a vehicle, must be able to withstand these loads during its entire time of use. When a new wheel is developed, the form of the wheel, the material thickness and the type of material have to be chosen in such a way that a sufficient operating strength is obtained with minimum weight. For testing the operating strength, road tests are carried out on vehicles, e.g. on suitable test tracks on the one hand, on the other hand, different test methods are used, in order to simulate the driving loads on: the vehicle wheel. At the moment, a set of test methods are available, with which the static operating loads and the dynamic load components, which are to correspond as exactly as possible to a momentary driving condition, can be simulated. For the quality testing in the series production, test methods are usually used, which are carried out with a stationary, that is, a constant load. During the real driving operation, the radial and axial forces acting on the vehicle wheel are not constant, but depend on a plurality of factors. So as to create non-stationary radial and axial forces on a wheel to be tested, which can be changed with time, biaxial wheel test stands have been developed. A corresponding biaxial wheel test stand (ZWARP) has been used by most wheel manufacturers since about 1989, and is for example described in its structure in "Automobiltechnische Zeitschrift", 88 (1986), page 543 pp. The wheel to be tested rotates with the mounted tire on the inside of a drum with starting rings, which is driven by a drive unit, and is pressed against the drum by means of a load unit. The load unit of the wheel test stand (ZWARP) is applied by two separate servo-hydraulic load cylinders, which are arranged perpendicular to one another on horizontal carriages with double columns. One of the load cylinders is a vertical load cylinder for adjusting a vertical force, the other is a horizontal load cylinder for adjusting a horizontal force. So as to be able to achieve an approximation to real wheel loads, the camber angle of the wheel can be adjusted relative to the drum by means of a camber cylinder secured to a pivot head.

The biaxial wheel test stand (ZWARP) has proved itself during use. However, the simulations on the wheel test stand only lead to useful results if the access parameters for the wheel test stand (ZWARP) get as close as possible to the stress condition during the real driving operation. So as to fulfill this condition, the stresses of a test wheel depending on the corresponding wheel geometry were measured up to now in a real road test with intensive measurements using strain gauges (DMS). For adjusting the access parameters for the biaxial wheel test stand (ZWARP), the individual access parameters (vertical force, horizontal force, camber angle) are varied in an iterative process, until the previously obtained strain and tension variations at characteristic wheel parts during the real road test are also measured at the same wheel parts during the simulation test. The adjustment of the horizontal and the vertical load cylinders takes place by controlling the force, the adjustment of the camber angle takes place by controlling the angle. As the reference signal of the known control method for the biaxial wheel test stand is formed by the strain variations established during the road test, one cannot neglect the previous determination of the strain variations in the wheel parts by means of DMS measurements.

SUMMARY OF THE INVENTION

It is the object of the present invention to suggest a control method and a biaxial wheel test stand suitable for this, which enable an adjustment of the access parameters of the wheel test stand without previous strain gauge measurements.

This object is solved in its aspect according to the method of the invention, in that the adjustment of the horizontal force, the vertical force and the camber angle takes place in dependence on the wheel radial or restoring force and the wheel side force established during the real driving operation, and that the position of the point of application of the resulting force of the said wheel radial or restoring force and the said wheel side force is used as the control magnitude for the camber angle.

The wheel radial force and the wheel side: force can be measured in a simple manner during the road test with special measuring hubs which are independent of the wheel geometry and represent wheel-specific magnitudes which are dependent on the rim size, the tire, the vehicle and the test track. It has now been shown with tests at vehicle wheels, that the stress of a vehicle wheel in the wheel test stand is identical to the stresses of the vehicle wheel during the real road test, when the force resulting from the wheel radial force and the wheel side force when the tire contacts the road is identical or corresponds to a large extent to the force resulting in the wheel test stand (ZWARP) with regard to the amount, direction and position. After this hypothesis has been verified, it has been found that the position of the point of application of the resulting force of the wheel radial force and the wheel side force can be used as the control magnitude for the camber angle. As the previous time and cost consuming measuring series with strain gauge at the vehicle wheel and also during the simulation in the wheel test stand a measurement with a strain gauge can be foregone with the method according to the invention, the control method according to the invention for establishing the access parameters for the wheel test stand offers substantial time and cost advantages. It is an additional advantage that the influence of the tire and the tire air pressure in the ZWARP is considered or eliminated, as the data of the tire determined during the real road test are readjusted at the wheel test stand with the control method according to the invention.

With the preferred embodiment of the invention, the camber cylinder force is measured so as to enable the use of the position of the point of application of the force as a control magnitude. This measurement can take place in a particularly simple manner with a capsule-type dynamometer arranged at the camber cylinder. This procedure; has the advantage that the values measured at the camber cylinder are not falsified by friction losses or measurement errors, as could for example occur during the pressure measurement at the camber cylinder.

So as to be able to carry out the control method with well-structured algorithms, the position of the point of application of the resulting force is defined by the distance of the point of application of the force from the center of the wheel with a preferred embodiment of the method. With this arrangement of the method, the algorithm for the position of the point of application of the force, the equation dependent on the data of the tire which can be calculated and the geometric relationship in the wheel test stand can be determined as $$R_{DS}=(M_{Fs}+Fa \times R_{dyn})/Fr-a1$$

wherein $M_{Fs}$: moment of the camber cylinder force around the head pivot point S;

Fa: axial wheel side force according to the road test;

Fr: radial wheel restoring force according to the road test;

$R_{dyn}$: dynamic roll radius; and a1: distance between pivot point S of the camber angle and the center of the tire.

With the preferred embodiment of the method, the vertical force, the horizontal force and the camber angle are changed by means of a control and an evaluation unit until an unambiguous solution is found for the above algorithm, together with the algorithms $$Fr=-Fh \times \sin(y)-Fv \times \cos(y); \text{ and}$$

$$Fa=-Fh \times \cos(y)+Fv \times \sin(y)$$

or $$Fv=-Fr \times \cos(y)+Fa \times \sin(y); \text{ and}$$

$$Fh=-Fr \times \sin(y)-Fa \times \cos(y).$$

with given $R_{dyn}$, $R_{DS}$, Fa and Fr.

With a further preferred embodiment of the method, the position of the point of application of the force is moved into the tire center in a first approximation, that is, the center offset from the point of application of the force of the wheel center is set to zero. In extensive measurements it was surprisingly established, that, with this approximation solution, if the wheel radial force and the wheel side force are for example known from the road test, but not the position of the point of application of the force, a sufficiently exact correspondence of the access parameters adjusted at the wheel test stand with the vehicle loads resulting from the real driving operation can be produced.

A particularly suitable wheel test stand for carrying out the method is characterized in that the wheel radial force and the wheel side force known from the real driving operation can be entered into the control and evaluation unit as input magnitudes and that a measuring device is provided which measures the camber cylinder force acting on the camber cylinder. As already explained above, with the preferred embodiment of the wheel test stand, the measuring device consists of a capsule-type dynamometer assigned to the camber cylinder, as the capsule-type dynamometer enables a very simple and exact measurement of the camber cylinder force free of friction losses and hysteresis errors.

BRIEF DESCRIPTION OF THE DRAWING

The foregoing improvements, objects, and others will in part be obvious and in part be pointed out more fully hereinafter in conjunction with the written description of the preferred embodiments of the invention shown in the accompanying drawing, in which:

FIGURE is a schematic diagram of the biaxial wheel test stand according to the present invention.

DESCRIPTION OF THE PREFERRED EMBODIMENTS

Referring to the only drawing (FIGURE), the essential geometric relationships of a biaxial wheel test stand (ZWARP) are shown as double arrows, and the forces to be used for determining the access parameters are shown as force arrows. A detailed representation of the wheel test stand was foregone, as a corresponding wheel test stand is described for example in ATZ 88 (1986) 10, p. 543 pp, which article is referred to herein. Of the wheel test stand, only the drum 1 with the schematically shown starting rings 2,3 is shown. The distance between the starting rings 2,3 can be changed, so that vehicle wheels 4 having different tire and rim width can be tested on the same wheel test stand. The drum 1 is driven by means of a drive motor, not shown, arranged underneath the drum. The drum 1 and the drive motor are parts of the drive unit, not shown. The vehicle wheel 4, consisting of bowl 5, rim 7 and mounted tire 6, is secured with its bowl 5 in a releasable manner at a pivot head, not shown, which can be pivoted around the pivot point S. The pivot point S of the pivot head is executed in a pivotal manner by means of the lever mechanism shown by the double arrows a2, a3, so as to be able to adjust the camber angle y, that is, the angle between the wheel axis y' and the drum axis t'. The Y-axis of the X-Y coordinate system of the test stand is parallel to the drum axis t'. For the camber adjustment of the camber angle y, a camber cylinder indicated by means of the force arrow Fs is provided, which acts on the lever mechanism a2, a3. The lever mechanism a2, a3 or the pivot head have constant magnitudes or dimensions dependent on the wheel test stand. The bearing point A can therefore be changed on a circular path around the pivot point S by means of changing the distance of the camber cylinder Fs. The distance between the camber angle pivot point S and the bearing point B is also given as a constant and depends on the geometric relationships of the wheel test stand, as is indicated by the distance arrows or double arrows a4 and a5.

The capsule-type dynamometer, not shown, is arranged at the bearing point B, with which the force acting on the camber cylinder can be measured. The pivot head and the camber cylinder are connected to a load unit, not shown, which is formed by two separate load cylinders, which are arranged at horizontal carriages with a double column guide. A servo-hydraulic horizontal cylinder acts parallel to the drum axis t', so as to load the wheel 4 with the horizontal force Fh against the drum 1 laterally, and a servo-hydraulic vertical cylinder acts perpendicular to the drum axis t', so as to press the wheel 4 against the drum 1 with the force Fv. By means of a control and evaluation unit, not shown, the vertical force Fv, the horizontal force Fh and the camber angle y can be adjusted. Furthermore, the force of the camber cylinder Fs measured by the dynamometer is measured and processed by means of the control and evaluation unit.

In the upper right corner of the FIGURE, a resulting force Fres is shown, which consists of the wheel radial force Fr and the wheel side force: Fa, whereby these two forces were determined beforehand in a real road test for example with measuring hubs. Furthermore, the dynamic roll radius $R_{dyn}$ and the position of the resulting force Fres were also measured in this road test or with an even test stand, that is, the tire restoring point resulting from the real road test was determined beforehand.

This position is referred to as $R_{DS}$ and represents the distance of the point P of application of the force in the ZWARP to the wheel center x'.

The applicant has proved with comparative DMS measurements, that the real wheel stresses can be simulated with the wheel test stand, if the force resulting from the wheel radial force and the wheel side force determined during the road test is identical to the resulting force adjusting itself in the wheel test stand (ZWARP) with regard to amount, direction and position. By means of proving this hypothesis, a control method can be set up, according to which the access parameters (horizontal force Fh, vertical force Fv and camber angle y) can be determined if the wheel radial force Fr, the wheel side force Fa, the dynamic roll radius $R_{dyn}$ and the distance $R_{DS}$ from the wheel center are known, if the camber cylinder force Fs is measured as an additional factor. It results from the force equilibrium in the X-Y coordinate system in the load unit or in the X'-Y' coordinate system of the vehicle wheel 4 to be tested for the link of the resulting force Fres or the wheel radial force and the wheel side force Fa with the access parameters adjustable at the load unit:

$$Fv=-Fr \times \cos(y) + Fa \times \sin(y); \text{ and}$$

$$Fh=-Fr \times \sin(y) - Fa \times \cos(y)$$

So as to find an unambiguous solution for this equation system and corresponding to the real stresses of the vehicle wheel, the equation $$R_{DS} = M_{Fs} + Fa \times (R_{dyn})/Fr - a1$$

is entered into the evaluation and control unit as a further algorithm, which equation can be obtained from the moment equilibrium in the camber angle (pivot point S). As the camber cylinder force Fs is measured and the position of the camber cylinder is directly linked to the camber angle or can be determined by means of y and/or the constant measurements a2, a3, a4, a5 and y specific to the test stand, the moment $M_{Fs}$ which produces the force Fs around the pivot point S can be calculated, so that an unambiguous solution can be found, in iterative steps, automatically controlled, for the algorithms given above for the access parameters (Fh, Fv, y) to be adjusted.

The determination of the access parameters for the wheel test stand (ZWARP) is effected hereby independently from the insertion depth E and the bowl and rim geometry. Therefore, the same access parameters can be used when the same wheel radial forces and wheel side forces were determined for a vehicle wheel during a road test. Surprisingly, it has also been shown that, even without knowledge of the wheel restoring point adjusting itself during the driving operation, a sufficiently exact determination of the access parameter can be found, when the wheel center distance $R_{DS}$, is set to zero, that is, moved to the wheel center x'.

While considerable emphasis has been placed herein on the specific structures and structural interrelationships between the component parts of the preferred embodiments of the invention, it will be appreciated that other embodiments can be made and that many changes can be made in the preferred embodiments without departing from the principles of the invention. Accordingly, it is to be distinctly understood that the foregoing descriptive matter is to be interpreted merely as illustrative of the present invention and not as a limitation.

What is claimed is:

1. A method of controlling a biaxial wheel test stand for simulating driving loads, the test stand including a load unit having a servo-hydraulic vertical load cylinder for adjusting a vertical force, a servo-hydraulic load cylinder for adjusting a horizontal force, and a pivot head which can be adjusted by means of a camber cylinder about a head pivot point for adjusting the magnitude of a camber angle of a wheel to be tested, the test stand further including a drive unit with a driven drum having starting rings, the wheel to be tested being pressed against the starting rings pressed with the load unit, whereby the vertical load cylinder and the horizontal load cylinder are adjusted by controlling the vertical and horizontal forces respectively and the camber cylinder by controlling the angle, said method including the steps of adjusting the horizontal force, the vertical force and the camber angle based on the wheel radial force and the wheel side force previously determined during a road test, and using the position of a point of application of a resulting force of the wheel radial force and the wheel side force as the control magnitude for the camber angle.

2. A method of controlling a biaxial wheel test stand for simulating driving loads the test stand including a load unit having a servo-hydraulic vertical load cylinder for adjusting a vertical force, a servo-hydraulic load cylinder for adjusting a horizontal force, and a pivot head which can be adjusted by means of a camber cylinder about a head pivot point for adjusting the magnitude of a camber angle of a wheel to be tested, the test stand further including a drive unit with a driven drum having starting rings, the wheel to be tested being pressed against the starting rings pressed with the load unit, whereby the vertical load cylinder and the horizontal load cylinder are adjusted by controlling the vertical and horizontal forces respectively and the camber cylinder by controlling the angle, said method including the steps of adjusting the horizontal force, the vertical force and the camber angle based on the wheel radial force and the wheel side force previously determined during a road test, using the position of a point of application of a resulting force of the wheel radial force and the wheel side force as the control magnitude for the camber angle, and measuring the force of the camber cylinder and using the measured camber force as the control magnitude for determining the point of the application of the resulting force.

3. The method of controlling according to claim 2 wherein the point of application of the resulting force is spaced a distance from the wheel center.

4. The method of controlling according to claim 3 further including the step of calculating the resulting force distance of the point of application of the resulting force by means of the equation $$R_{as}=(M_{Fs}+Fa \times R_{dyn})/Fr-a1 \text{ wherein}$$

$M_{Fs}$: the moment of the camber cylinder force around the head pivot point;

Fa: the axial wheel side force from the road test;

Fr: the wheel radial force from the road test;

$R_{dyn}$: the dynamic roll radius; and, a1: a distance between the head pivot point and the tire center.

5. The method of controlling according to claim 4 further including the step of adjusting the vertical force, the horizontal force and the camber angle by means of a control or evaluation unit, until an unambiguous solution for the equations is reached $$R_{DS}=(M_{Fs}+Fa \times R_{dyn})/Fr-a1;$$

$$Fv=-Fr \cdot \cos(y)+Fa \times \sin(y) \text{ and}$$

$$Fh=-Fr \times \sin(y) \times Fa \times \cos(y)$$

wherein $R_{DS}$: the resulting force distance;

$M_{Fs}$: the moment of the camber cylinder force around the head pivot point;

Fa: the axial wheel side force from the road test;

$R_{dyn}$: the dynamic roll radius;

Fr: the wheel radial force from the road test;

a1: the distance between the, head pivot point and the tire center;

Fv: the vertical force; and,

Fh: the horizontal force.

6. The method of controlling according to claim 5 further including the step of approximating the position of the resulting force application point by setting the resulting force distance to zero.

7. A method of controlling a biaxial wheel test stand for simulating driving loads, the test stand including a load unit having a servo-hydraulic vertical load cylinder for adjusting a vertical force, a servo-hydraulic load cylinder for adjusting a horizontal force, and a pivot head which can be adjusted by means of a camber cylinder about a head pivot point for adjusting the magnitude of a camber angle of a wheel to be tested, the test stand further including a drive unit with a driven drum having starting rings, the wheel to be tested being pressed against the starting rings pressed with the load unit whereby the vertical load cylinder and the horizontal load cylinder are adjusted by controlling the vertical and horizontal forces respectively and the camber cylinder by controlling the angle, said method including the steps of adjusting the horizontal force, the vertical force and the camber angle based on the wheel radial force and the wheel side force previously determined during a road test, using the position of a point of application of a resulting force of the wheel radial force and the wheel side force as the control magnitude for the camber angle, and calculating the resulting force distance of the point of application of the resulting force by means of the equation $$R_{DS}=(M_{Fs}+Fa \times R_{dyn})/Fr-a1$$

wherein $M_{Fs}$: the moment of the camber cylinder force around the head pivot point;

Fa: the axial wheel side force from the road test;

Fr: the wheel radial force from the road test;

$R_{dyn}$: the dynamic roll radius; and, a1: a distance between the head pivot point and the tire center.

8. A method of controlling a biaxial wheel test stand for simulating driving loads, the test stand including a load unit having a servo-hydraulic vertical load cylinder for adjusting a vertical force, a servo-hydraulic load cylinder for adjusting a horizontal force, and a pivot head which can be adjusted by means of a camber cylinder about a head pivot point for adjusting the magnitude of a camber anile of a wheel to be tested, the test stand further including a drive unit with a driven drum having starting rings, the wheel to be tested being pressed against the starting rings pressed with the load unit, whereby the vertical load cylinder and the horizontal load cylinder are adjusted by controlling the vertical and horizontal forces respectively and the camber cylinder by controlling the angle, said method including the steps of adjusting the horizontal force, the vertical force and the camber angle based on the wheel radial force and the wheel side force previously determined during a road test, using the position of a point of application of a resulting force of the wheel radial force and the wheel side force as the control magnitude for the camber angle, and adjusting the vertical force, the horizontal force and the camber angle by means of a control or evaluation unit, until an unambiguous solution for the equations is reached $$R_{DS}=(M_{Fs}+Fa \times R_{dyn})/Fr-a1$$

$$Fv=-Fr \times \cos(y)+Fa \times \sin(y) \text{ and}$$

$$Fh=-Fr \times \sin(y)-Fa \times \cos(y),$$

wherein $R_{DS}$: the resulting force distance;

$M_{Fs}$: the moment of the camber cylinder force around the head pivot point;

Fa: the axial wheel side force from the road test;

$R_{dyn}$: the dynamic roll radius;

Fr: the wheel radial force from the road test;

a1: the distance between the: head pivot point and the tire center;

Fv: the vertical force; and,

Fh: the horizontal force.

9. A method of controlling a biaxial wheel test stand for simulating driving loads, the test stand including a load unit having a servo-hydraulic vertical load cylinder for adjusting a vertical force, a servo-hydraulic load cylinder for adjusting a horizontal force, and a pivot head which can be adjusted by means of a camber cylinder about a head pivot point for adjusting the magnitude of a camber angle of a wheel to be tested, the test stand further including a drive unit with a driven drum having starting rings, the wheel to be tested being pressed against the starting rings pressed with the load unit, whereby the vertical load cylinder and the horizontal load cylinder are adjusted by controlling the vertical and horizontal forces respectively and the camber cylinder by controlling the angle, said method including the steps of adjusting the horizontal force, the vertical force and the camber angle based on the wheel radial force and the wheel side force previously determined during a road test, using the position of a point of application of a resulting force of the wheel radial force and the wheel side force as the control magnitude for the camber angle, and approximating the position of the resulting force application point by setting the resulting force distance to zero.

10. A wheel test stand for simulating driving loads on a vehicle wheel, said test stand comprising a load unit having a servo-hydraulic vertical load cylinder for adjusting a vertical force on the wheel, a servo-hydraulic horizontal load cylinder for adjusting a horizontal force on the wheel, and a pivot head which can be adjusted by means of a servo-hydraulic camber cylinder for adjusting the camber angle of the wheel; a drive unit having a driven drum with starting rings, to which the wheel can be pressed by means of the load unit; a control and evaluation unit for adjusting the horizontal force, the vertical force and the camber angle; and a measuring unit connected to the camber cylinder which measures a camber cylinder force acting on the camber cylinder.

11. The wheel test stand according to claim 10 wherein the measuring unit consists of a capsule-type dynamometer connected to the camber cylinder.

* * * * *